March 28, 1967 N. B. TALSOE 3,311,904

CONVERSION OF PULSE PHASE SIGNALS TO NRZ SIGNALS

Filed Aug. 22, 1963

INVENTOR
NORMAN B. TALSOE
BY Thomas J. Nikolai
ATTORNEY

United States Patent Office 3,311,904
Patented Mar. 28, 1967

3,311,904
CONVERSION OF PULSE PHASE SIGNALS TO NRZ SIGNALS

Norman B. Talsoe, St. Paul, Minn., assignor to Sperry Rand Corporation, New York, N.Y., a corporation of Delaware Filed Aug. 22, 1963, Ser. No. 303,791
7 Claims. (Cl. 340—174.1)

Figure 1:
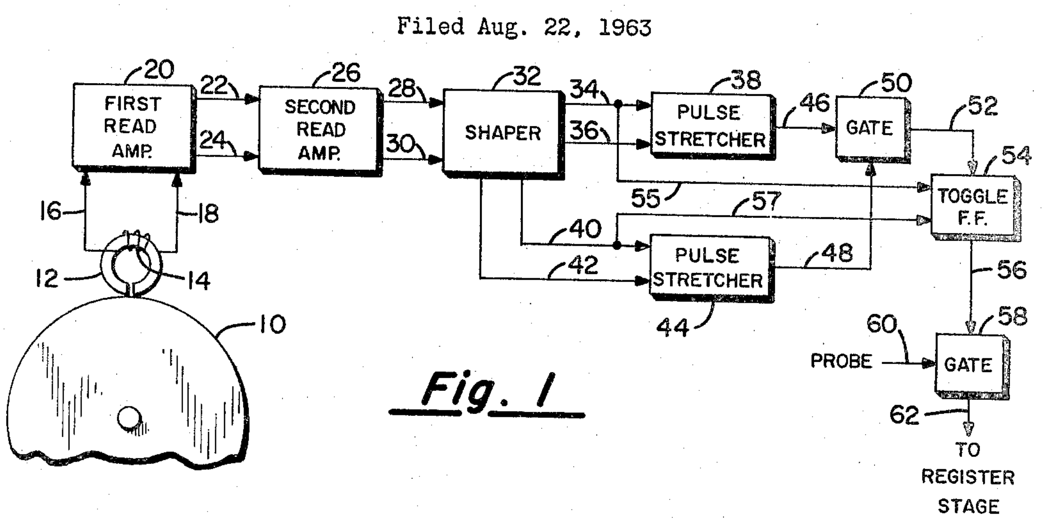

This invention relates generally to magnetic storage systems for use in digital data processing apparatus and more specifically to an improved playback circuit for use in a recording system wherein digital values recorded on a surface of a moving magnetic medium may be sensed over a longer period of time than heretofore possible when using prior art devices.

As is well known in the digital data recording art, information is recorded on a magnetic medium by magnetizing the medium in one or the other of its two possible states of saturation in accordance with the polarity of the current flowing through the coil of a writing transducing head. Playback or recovery of the information is accomplished by moving the surface with respect to a reading transducing head such that the resulting flux variations induce voltage signals into the transducing head winding. The output signal from the transducing head is proportional to the rate of change of flux.

It has been customary in the digital recording art to write each digit in synchronism with an externally generated clock pulse such that the information so recorded may be later retrieved by counting the clock pulses from a predetermined fiducial mark until a predetermined number (an address) has been reached. When the storage medium is a magnetic drum or tape, the clock pulses are read off from a special timing track which runs parallel to the information tracks. In other words, for each cell area on the information track there is a corresponding pulse recorded in a cell area on the timing track. It can be seen then that the playback of an information pulse should occur in synchronism with the reading of a clock pulse from the timing track. Generally, the digital values read out from the information tracks are applied to a coincidence gate along with the clock pulse from the timing track. If the coincidence gate produces an output at the time that the clock pulse (termed a probe signal) is applied this is an indication that a first digital value was stored in the cell area in question whereas if no signal appears at the output of the coincidence circuit at the probe time this is an indication that the other digital value has been stored in the cell area.

As the pulse packing density of the system increases the time of application of the probe signal becomes extremely critical for there is only a very short period of time in which this probe signal must appear. More specifically, if a cell period is defined as the time interval it takes for a cell area to pass by the reading transducing head, prior art phase modulated systems requires that the probe signals appear in only one half of a cell period in order to uniquely identify the digital value recorded in the cell area. This is due to the fact that the phase of the voltage signal induced in the reading transducing head is used to identify the digital value. For example, when a "1" bit is recoded in a cell area, the playback signal may first go positive for a portion of the cycle and subsequently go negative. On the other hand, if the binary digit "0" is recorded in the cell area the signal first goes negatitve for a portion of the cycle and then positive. This is generally referred to as a pulse phase read out signal. It is obvious that in order to uniquely identify the digital value, it is necessary that the probe signal appear in a predetermined one-half cell period. If there should be any variation in the time of application of the probe signal there is a possibility that the output indication from the coincidence gate would be for the opposite digital value than the one stored in the cell area in question.

Also, in a parallel recording system wherein the bits of a word of data are recorded on parallel tracks and read back simultaneously by plural reading heads, a slight variation in the parallel relationship of the reading heads with the moving medium (termed "skew") may cause an erroneous readout unless the probe signal is quite accurately applied in point of time.

The present invention obviates these problems and allows wider probe signal margins than can possibly be used with pulse phase read out signals. This is accomplished by a playback circuit which converts the pulse phase read out signals to so-called non-return to zero (NRZ) read out signals. As is well known in the art, in an NRZ recording system the flux shifts from one level to the other only when the new digit is different from the one in the preceding cell. It is to be understood, however, that in the recording system with which the present invention is used, the data is not initially recorded in the NRZ mode. The initial recording may be in either the return to zero (RZ) mode or in the double frequency write mode wherein a low frequency signal corresponds to a binary "0" while a high frequency signal corresponds to a binary "1." In both of these recording techniques, the playback signals picked up by the transducing head is a pulse phase read out signal. The apparatus of this invention is effective to convert this pulse phase read out signal to an NRZ signal. As will be pointed out more fully later on in this specification when a non-return to zero type playback signal is applied to the data input of the coincidence gate, the timing requirements for the probe signals are much less stringent.

It is accordingly an object of the present invention to provide a novel playback circuit for a digital data recording system for converting pulse phase read out signals to NRZ signals.

Another object of the present invention is to provide a novel playback circuit for a digital data recording system wherein wider margins are allowed for the time of application of the probe signals.

Still another object of this invention is to provide a magnetic playback system permitting extremely high recording densities to be employed.

Yet another object of the invention is to provide a playback circuit for a digital recording system wherein the susceptibility of errors due to skew in probing data on parallel tracks is decreased.

In converting the voltage signals induced in the reading transducing head from a pulse phase representation to a NRZ representation, the signals from the head are applied to a shaper circuit which clips and shapes the head voltage to provide a rectangular waveform. The data is now contained in the phase relationship of the output of the shaper circuit. The remainder of the circuitry is employed to perform the desired conversion. The information signals and the complement of the information signals appear at the output of the shaper circuit and from there are applied to a pair of pulse stretching circuits. These circuits are designed to be triggered on the excursions in a predetermined direction of the waveforms from the shaper circuit and produce an output signal, the duration of which is less than one but greater than one-half of a cell period. A typical pulse duration may be three-fourths of a cell period. The output from these two pulse stretcher circuits are applied to the input terminals of a coincidence gate, which, in turn, produces toggling pulses on its output line whenever the output from the pulses on its output line whenever the output from the pulse stretcher circuits are simultaneously of a predetermined level. It may also be seen that a toggling pulse is developed only at the times immediately following a transition from a "1" to a "0" or a "0" to a "1." These toggling pulses are applied to the toggle input terminal of a toggle type flip-flop. A toggle flip-flop is an electronic circuit of the bistable multivibrator class, but is distinguished from the SET-CLEAR type multivibrator by the fact that a pulse of the proper polarity applied to a single input thereto causes the flip-flop to revert from a first state to a second state while a second pulse on the same line causes a reversion from the second state back to the first state. A SET-CLEAR flip-flop, on the other hand as two input lines. A signal of the proper polarity applied to a first of the two input lines causes the flip-flop to switch from one state to another state provided it is not already in that state. In order to switch the flip-flop back to its original condition, it is necessary to apply an input signal to the other of the two input lines. Upon the occurrence of each toggle pulse, then, the flip-flop changes from one of its stable states to the opposite stable state where it remains until a second toggle input pulse forces the flip-flop circuit to revert to its former state. The signal appearing on the output line of the toggle flip-flop is then a NRZ representation of the input waveform.

The signal from the flip-flop is applied to a first input terminal of a second coincidence gate along with the read probe pulses, such that an output signal will be produced by the second coincidence circuit whenever the probe signal and the signal from the toggle flip-flops are of like polarity. This output may arbitrarily be defined as a binary "1" digit value. If no signal appears on the output terminal of the second coincidence circuit at the time that the probe signal is applied, it is known that a binary "0" digit value had been stored in the cell area in question.

It is another object of the invention, therefore, to provide a novel combination of well known electronic circuits which cooperate to convert a readback signal from a pulse phase representation to a NRZ representation.

Figure 2:
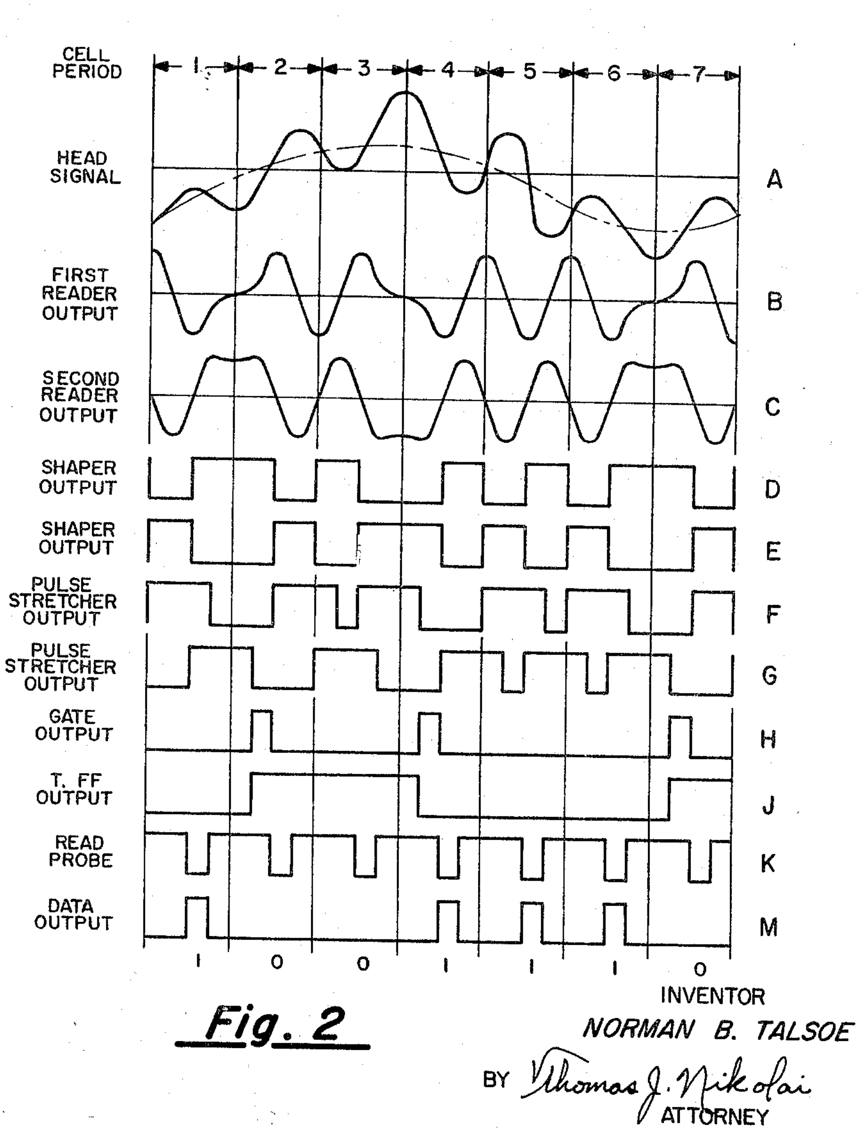

Other objects, features and advantages will appear in the subsequent detail description which is accompanied by drawings wherein:

FIG. 1 illustrates in block diagram form the magnetic recording playback system embodying the invention; and, FIG. 2 illustrates the waveforms observed at various points in the circuit of FIG. 1.

With reference now to the drawings, and more particularly to FIG. 1 thereof, it can be seen that there is provided a magnetic drum 10 having a magnetizable surface or medium affixed to the peripheral surface thereof. As will become apparent to those skilled in the art, the playback circuit of this invention is well suited for use in a recording system wherein magnetic tape is the magnetizable medium, and there is no intent to limit the invention to use in a drum or disc system. The drum 10 is adapted to be rotated at high speed by a suitable drive apparatus (not shown). Located in a close but non-contact relationship with the surface of the drum 10 is a reading transducing head 12 having a winding 14 thereon. As the cell areas on the drum track associated with this head pass by, there is induced in the winding 14 a voltage which is proportional to the rate of change of flux, produced by the magnetized spots contained in these cell areas. This signal is applied by way of conductors 16 and 18 to the input terminals of a first reading amplifier 20. Amplifier 20 not only functions to increase the amplitude of the signal induced in the winding 14, but also contains a suitable differentiating circuit for differentating the voltage signals applied thereto. The output signals from the first reading amplifier 20 are applied by way of conductors 22 and 24 to a second reading amplifier 26 which also contains a differentiating circuit. While the circuit illustrated in FIGURE 1 includes two stages of differentiation it should be undertsood that only a single stage may be required depending upon the writing technique employed. More specifically, when a Return-to-Zero (RZ) write scheme is employed during the recording step, only one stage of differentiation is preferred. However, if recording is accomplished by using a phase modulating technique two stages of differentiation are required. It should therefore be understood that in showing two differentiating stages in the circuit of FIGURE 1, there is no intention of limiting the invention to a system wherein pulse phase write signals are employed during recording. In other words, the playback circuit of this invention may be utilized to convert any readback signal containing data in the phase relation of the readback signal to a NRZ representation of the data.

After undergoing amplification and differentiation the signals induced in the winding 14 of the transducing head are applied by way of conductors 28 and 30 to the input terminals of a shaper circuit 32. The shaper 32 operates in a well known manner to convert the input waveform to a rectangular waveform. As such, the shaper may include further amplifying stages and a diode clipper network, the amplifiers serving to form extremely sharp wave fronts and the clipper serving to eliminate that portion of the input waveforms which exceeds a predetermined threshold level.

The direct output of the shaper 32 is applied by way of conductors 34 and 36 to a first pulse stretching circuit 38. The complement representation of the signal appearing on conductors 34 and 36 appear on conductors 40 and 42 and are applied to a second pulse stretching network 44. The pulse stretching circuits 38 and 44 may comprise monostable multivibrator circuits adapted to be triggered by a negative-going excursion of the input thereto and are effective to produce an output pulse of a predetermined pulse duration on their respective output lines 46 and 48.

The output signals from the pulse stretching circuits are applied to a first and second input terminals of a coincidence gate 50. When the signals on the lines 46 and 48 are simultaneously of a predetermined polarity, the gate 50 will be fully enabled and will produce an output signal on its output conductors 52. While many forms of coincidence circuits may be employed in the apparatus of this invention, the gate 50 is preferably a negative AND INVERTER. As such, the gate 50 produces a positive output pulse if and only if both of the signals applied to the input terminals are simultaneously negative.

The output conductor 52 of the gate 50 is connected to the toggle input terminal of a toggle flip-flop 54. The toggle flip-flop 54 has two other inputs thereto coming from the output lines 34 and 40 of the shaper circuit 32 by way of conductors 55 and 57, respectively.

One side of the toggle input flip-flop 54 is connected by means of a conductor 56 to a first input terminal of a coincidence gate 58. The second input to the gates 58 receives signals from a source of clock pulses which, as was mentioned in the introductory portion of the specification, may be a timing track on the drum 10. A signal appears on the input line 60 to the gate 58 once during each cell period and serves as a probe to determine the state of the toggle flip-flop 54 at the time in question. If the flip-flop 54 is in, say, the arbitrarily defined one state at the time that the probe signal appears on the line 60, the gate 58 will produce an output pulse on the line 62. However, if the flip-flop 54 is in the other of its two stable states, i.e., the "0" state, no signal will appear on the output conductor 62 of the gate 58 at the time that the probe signal appears on the input lines 60. The absence of an output signal on conductor 62 at the probe time is indicative of the fact that the flip-flop 54 is in its arbitrarily defined "0" state.

OPERATION

Now that the circuit organization and connections have been described in detail, consideration will next be given to the mode of operation of the playback circuit of this invention.

With reference now to the drawing and more particularly to FIG. 2 thereof, the principles of the invention will be better understood from the following discussion of the signal waveforms illustrated and their relation to the apparatus of FIG. 1.

FIG. 2*a* illustrates the waveforms of the voltage signals induced in the winding 14 of the transducing head 12 during cell periods 1 through 7 when the binary digits 1001110 are recorded in cell areas 1 through 7, respectively. This waveform may be considered a pulse phase representation of the digits stored in the corresponding cell areas since the information lies in the phase relationship of the signals. For example, with a binary "1" digit stored in cell area 1 the voltage induced in the transducing head first goes positive for one-half the cell period and then swings negative. In cell area 2, however, a "0" digit is stored as is indicated by the fact that the voltage waveform is negative for approximately half the cell period and then goes positive for the remaining half of the cell period.

This head signal is applied by way of conductor 16 and 18 to a first reading amplifier 20. In adidtion to increasing the amplitude of the feedback signal, a differentiating circuit contained in the reading amplifier serves to differentiate the head signal, as can be clearly seen from the waveform of FIG. 2*b*. The differentiation of the head signal serves to improve the resolution of the playback signal and to eliminate the low frequency base level shift component present in the playback signal. As can be seen from the waveform of FIG. 2*a*, at the point of transition between a "0" and a "1" or between a "1" and a "0," a rather large transient results as compared with the waveform resulting when a series of identical digit values are played back from adjacent cell areas. Resolution, as the term is used herein, is defined as the ratio of the voltage amplitude produced when a series of identical values are recorded in adjacent cell areas to the amplitude of the voltage resulting at the transition from a "1" to a "0" or a "0" to a "1," and is usually expressed as a percentage. It should be noted from the waveform of FIG. 2*b* that the large amplitude transient signals appearing at transition points are substantially removed. Also, the base level remains relatively constant.

The second reading amplifier and differentiator 26 receives as an input a signal having the waveform of FIG. 2*b* and produce at the output thereof a signal having the waveform of FIG. 2*c*. The amplification and differentiation of the waveform of FIG. 2*b* serves to further improve the resolution of the playback system and also serves to "square up" the playback signals.

The waveform of FIG. 2*c* appears on the output conductors 28 and 30 of the second read amplifier 26 and is applied to the shaper circuit 32. Although the pulse phase readout head signal of FIG. 2*a* could possibly be applied directly to the shaper circuit 32, with the remaining circuit elements serving to convert this pulse phase readout to a NRZ readout, it is preferred that the differentiating reading amplifiers 20 and 26 be included in order to obtain a higher degree of resolution in the playback signal.

As was mentioned earlier, the shaper circuit 32 contains one or more stages of amplification followed by a suitable clipping network. When the waveform of FIG. 2*c* is applied to the input terminals of the shaper the signal is amplified greatly so as to produce very sharp leading and trailing edges on the waves. The clipping network then serves to eliminate the portion of the waveform exceeding predetermined limits in the positive and negative direction. The rectangular waveform of FIG. 2*d* appears on the output lines 34 and 36 of the shaper circuit. The shaper circuit 32 also includes an inverter stage such that the waveform of FIG. 2*e* is made available on its output lines 40 and 42. It is to be noted that the waveforms of FIG. 2*d* and 2*e* are the inverse of each other.

When signals having the waveform of FIG. 2*d* are applied to the pulse stretching circuit 38 the waveform of FIG. 2*f* to appear on the output line 46. The pulse stretcher 38 may comprise a monostable multivibrator which is triggered by the negative-going excursion of the waveform of FIG. 2*d*. Once triggered, the pulse stretcher 38 produces a positive output signal for a period of time determined by the constants of the multivibrator. This time period is adjusted so as to be less than one but greater than one-half of a cell period. Similarly, the pulse stretcher 44 in the preferred embodiment of the present invention is also a monostable multivibrator which triggers on the negative-going excursions of the waveform of FIG. 2*e*. The timing of the pulse stretcher 44 is identical to that of pulse stretcher 38. FIG. 2*g* represents the waveform of the signals obtained from the pulse stretcher 44.

The signals from the pulse stretchers 38 and 44 are applied by way of the conductors 46 and 48 respectively to the input terimnals of a coincidence circuit 50. In the preferred embodiment of the present invention the coincidence circuits or gate 50 is a negative AND INVERTER circuit. Only when the signals on lines 46 and 48 are simultaneously negative will the gate 50 produce a positive output pulse on the conductor 52. The waveform of FIG. 2*h* clearly shows this relationship. The pulses appearing on line 52 are termed "toggle pulses" and are applied to the toggle input terminal of a toggle type flip-flop 54. The signals from the shaper 32 are applied to the other two inputs of the flip-flop 54 by way of conductors 55 and 57 serve to "steer" the toggle pulses appearing on the toggle input terminal 52 to force the output of the flip-flop to a predetermined state. More specifically, the flip-flop 54 is provided with a pair of A.C. coupled AND gates having the toggle input as one input to each. The other inputs to the pair come from the output of the shaper circuit, the line 55 connecting to one and the line 57 connecting to the other. In operation, depending upon which input at 55 or 57 is positive, the corresponding output side of the flip-flop 54 will switch negative when a positive pulse is simultaneously present on the toggle input line 52.

By including this feature in the flip-flop input circuit, the problem of the flip-flop getting out of synchronization with the readback signal waveform (which may occur due to a distortion of the head signal), is obviated. In effect, the toggle flip-flop 54 is re-synchronized during each transition of the readback signal from a "1" to a "0" or from a "0" to a "1." In order to initially synchronize the flip-flop with the readback signal, a complement of the first data bit in a section of the recording medium may be recorded in the cell area immediately preceeding this first data bit to insure that a transition will occur.

The waveform of FIG. 2*j* illustrates the signal which appears on the conductor 56 in response to the application of the toggle pulses of FIG. 2*h* and the shaper outputs of FIGURES 2*d* and 2*e* to the flip-flop 54. It can be seen that the first toggle pulse causes the flip-flop to switch from a first level or state to a second level or state where it remains until the arrival of a second toggle pulse. This second toggle pulse serves to switch the flip-flop 54 back to its original state.

When the waveforms of FIGS. 2*d* and 2*j* are compared, it can be seen that the effect of the pulse stretchers 38 and 44, the gate 50 and the toggle flip-flop 54 is to convert the playback signal from a pulse phase representation to a NRZ representation. If one were attempting to employ the readback signal of FIG. 2*d* directly, it can be seen that the probing must occur during a period of time less than one-half of a cell period in length in order to uniquely identify a digit value. By converting the pulse rate phase representation of FIG. 2*d* to the NRZ representation of FIG. 2*j*, it can be seen that substantially wider margins in the probe time can be tolerated.

In reading out the digit values from the waveform of FIG. 2*j* the wave is applied by way of conductor 56 to a first input terminal of a coincidence circuit 58. The circuit 58, like the coincident circuit 50 in the preferred embodiment of this invention, is a negative AND INVERTER circuit which receives negative-going clock or probe signals on its second input terminal 60. When and only when both of the inputs to the AND INVERTER circuit 58 are negative will a positive output signal appear on the conductor 62. Accordingly, when the waveforms of FIGS. 2*j* and 2*k* are applied to the input terminals of the gate 58, the waveform of FIGURE 2*m* appears on the output conductor 62.

Thus it can be seen that by providing a playback circuit for converting a pulse phase representation signal to a non-return to zero representation signal it is possible to tolerate wider variations in the time of application of the probe signals.

It is apparent that one skilled in the art may make numerious modifications and additions to the example of an embodiment of the apparatus for practicing the invention without departing from the principles disclosed herein. Consequently, the invention is to be construed as limited only by the spirit and scope of the appended claims.

What is claimed is:

1. In a magnetic recording system for a digital data processor wherein binary digits are recorded on a movable magnetic medium in discrete cell areas by at least partially magnetizing said medium in a first direction to represent a first digital value and in a second direction to represent a second digital value, playback circuit for converting the signals read back from said medium from a pulse phase representation to a non-return to zero representation, comprising:

transducing means positioned with respect to said medium to detect magnetic flux changes as said cell areas pass by for producing voltage signals, the phase of which in any cell period being indicative of the digital value recorded in the corresponding cell area;

pulse shaping means having first and second output terminals, adapted to receive said voltage signals from said transducing means for transforming said voltage signals to rectangular waves, the rectangular waves on said first output terminal being substantially 180° out of phase with respect to the rectangular waves on said second output terminal;

first and second pulse stretching circuits connected respectively to said first and second output terminals and adapted to be triggered by negative excursions of said rectangular waves for producing pulses, said pulses being of a duration greater than one-half but less than one cell period;

a coincidence circuit connected to receive the output from said first and second pulse stretching circuits; and a bistable circuit adapted to be switched from one stable state to the opposite stable state upon the occurance of an output from said coincidence circuit.

2. In a magnetic recording system for a digital data processor wherein binary digits are recorded on a movable magnetic medium in discrete cell areas by at least partially magnetizing said medium in a first direction to represent a first digital value and in a second direction to represent a second digital value, a playback circuit for converting the signals read back from said medium from a pulse phase representation to a non-return to zero representation, comprising:

transducing means positioned with respect to said medium to detect magnetic flux changes as said cell areas pass by said transducing means for producing voltage signals, the phase of which in any cell period being indicative of the digital value recorded in the corresponding cell area on said medium;

pulse shaping means having first and second output terminals adapted to receive said voltage signals from said transducing means for transforming said voltage signals to rectangular waves, the rectangular waves on said first output terminal being 180° out of phase with respect to the rectangular waves on said second output terminal;

first and second pulse stretching circuits connected respectively to said first and second output terminals adapted to be triggered by negative going excursions of said rectangular waves for producing pulses of a duration greater than one-half but less than one cell period;

an AND INVERTER coincidence circuit connected to receive the output from said first and second pulse stretching circuits; and a toggle flip-flop circuit adapted to be switched from one stable state to its opposite stable state upon the occurrence of an output from said coincidence circuit.

3. In a magnetic recording system for a digital data processor wherein binary digits are recorded on a magnetic medium in discrete cell areas by at least partially magnetizing said medium in a first direction to represent a first digital value and in a second direction to represent a second digital value, a playback circuit for converting the signals read back from said medium from a pulse phase representation to a non-return to zero representation, comprising:

transducing means positioned with respect to said medium to detect magnetic flux changes as said cell areas pass by for producing voltage signals, the phase of which in any cell period being indicative of the digital values recorded in the corresponding cell area;

a differentiating circuit connected to receive said voltage signals from said transducing means;

pulse shaping means having input terminals and first and second output terminals, said input terminals being connected to receive the output from said differentiating circuit, for transforming said output from said differentiating circuit to rectangular waves, the rectangular waves on said first output terminal being 180° out of phase with respect to the rectangular waves on said second output terminals;

first and second monostable multivibrator circuits connected respectively to said first and second output terminals, each adapted to be triggered by negative going excursions of said rectangular waves for producing positive pulses of a duration greater than one-half but less than one cell period;

an AND INVERTER coincidence circuit connected to receive the output from said first and second monostable multivibrator circuits for producing positive toggling pulses when the outputs from said first and second monostable multivibrator circuits are simultaneously negative; and a toggle flip-flop adapted to be switched from one stable state to the opposite stable state upon the occurrence of each toggling pulse.

4. In a magnetic recording system for a digital data processor wherein binary digits are recorded on a magnetic medium in discrete cell areas by polarizing said medium in a first direction to represent a first digital value and in a second direction to represent a second digital value, a playback circuit for converting the signals read back from said medium from a pulse phase representation to a non-return to zero representation, comprising:

transducing means positioned with respect to said medium to detect magnetic flux changes as said cell areas pass by for producing voltage signals, the phase of which in any cell period being indicative of the digital value recorded in the corresponding cell area;

a differentiating circuit connected to receive said voltage signals from said transducing means;

pulse shaping means including amplifying means and clipping means having input terminals and first and second output terminals, said input terminals being connected to receive the output from said differentiating circuit, for transforming said output from said differentiating circuit to rectangularly shaped waves, the rectangular waves on said first output terminal being substantially 180° out of phase with respect to the rectangular waves on said second output terminal;

first and second monostable multivibrator circuits connected respectively to said first and second output terminals, each adapted to be triggered by negative going excursions of said rectangularly shaped waves for producing positive pulse of a duration greater than one half but less than one cell period;

a negative AND INVERTER circuit connected to receive the output from said first and second monostable multivibrator circuits for producing toggling pulses when the outputs from said first and second monostable multivibrator circuits are simultaneously negative;

toggle flip-flop adapted to be switched from one stable state to the opposite stable state upon the occurrence of each toggling pulse; and a coincidence circuit having one input thereto connected to the output of said flip-flop and a second input connected to a source of clocking signals.

5. In a magnetic recording system for a digital data processor wherein binary digits are recorded on a magnetic medium in discrete cell areas by polarizing said medium in a first direction to represent a first digital value and in a second direction to represent a second digital value and having transducing means positioned with respect to said medium to detect magnetic flux changes as said cell areas pass by for producing voltage signals, the phase of which in any cell period being indicative of the digital value recorded in the corresponding cell area, apparatus for extending the time period during which said digital value may be sensed comprising:

pulse shaping means having input terminals and first and second output terminals, said input terminals being connected to receive the output from said transducing means, for transforming said voltage signals to rectangular waves, the rectangular waves on said first output terminal being 180° out of phase with respect to the rectangular waves on said second output terminal;

pulse stretching means connected respectively to said first and second output terminals, adapted to be triggered by predetermined excursions of said rectangular waves for producing pulses of a duration greater than one half but less than one cell period;

a first coincidence circuit connected to receive the output from said pulse stretching means for producing toggling pulses when the outputs from said pulse stretching means are simultaneously of a predetermined polarity;

a toggle flip-flop adapted to be switched from one stable state to the opposite stable state upon the occurrence of each toggling pulse; and a second coincidence circuit having a pair of input terminals the first of which is connected to an output of said flip-flop and the second of which is connected to a source of timing signals, the arrangement being such that the digital value recorded in any cell area may be gated by said timing signals over a longer time interval than one half of a cell period.

6. In a magnetic recording system for a digital data processor wherein binary digits are recorded on a magnetic medium in discrete cell areas by polarizing said medium in a first direction to represent a first digital value and in a second direction to represent a second digital value and having transducing means positioned with respect to said medium to detect magnetic flux changes as said cell areas pass by for producing voltage signals, the phase of which in any cell period being indicative of the digital value recorded in the corresponding cell area, apparatus for extending the time period during which said digital value may be sensed comprising:

pulse shaping means including amplifying and clipping means having input terminals and first and second output terminals, said input terminals being connected to receive the output from said transducing means, for transforming said voltage signals to rectangular waves, the rectangular waves on said first output terminal being 180° out of phase with respect to the rectangular waves on said second output terminal;

first and second pulse stretching means connected respectively to said first and second output terminals, each adapted to be triggered by predetermined excursions of said rectangular waves for producing pulses of a duration greater than one-half but less than one cell period;

a first coincidence circuit connected to receive the output from said pulse stretching means for producing toggling pulses when the outputs from said pulse stretching means are simultaneously of a predetermined level;

a toggle flip-flop adapted to be switched from one stable state to its opposite stable state upon the occurrence of each toggling pulse; and a second coincidence circuit having a pair of input terminals the first of which is connected to an output of said flip-flop and the second of which is connected to a source of timing signals, the arrangement being such that the digital value recorded in any cell area may be gated out of said second coincidence circuit by said timing signals over a longer time interval than one-half of a cell period.

7. In a magnetic recording system for a digital data processor wherein binary digits are recorded on a movable magnetic medium in discrete cell areas by saturating said medium in a first direction to represent a first digital value and in a second direction to represent a second digital value and having transducing means positioned with respect to said medium to detect magnetic flux changes as said cell areas pass by said transducing means for producing voltage signals the phase of which in any cell period being indicative of the digital value recorded in the corresponding cell area, apparatus for extending the time period during which said digital value may be sensed comprising:

pulse shaping means including amplifying and clipping means having input terminals and first and second output terminals, said input terminals being connected to receive the output from said tranducing means, for transferring said voltage signals to rectangular waves, the rectangular waves on said first output terminal being substantially 180° out of phase with respect to the rectangular waves on said second output terminal;

first and second monostable multivibrator circuits connected respectively to said first and second output terminals, adapted to be triggered by negative-going excursions of said rectangular waves for producing positive pulses of a duration greater than one-half but less than one cell period;

a first AND INVERTER coincidence circuit connected to receive the outputs from said first and second monostable multivibrator circuits for producing positive toggling pulses when the outputs from said first and second monostable multivibrator circuits are simultaneously of a negative polarity;

a toggle flip-flop adapted to be switched from one stable state to its opposite stable state upon the occurrence of each toggling pulse; and a second AND INVERTER coincidence circuit having a pair of input terminals the first of which is connected to an output of said flip-flop and the second of which is connected to a source of timing signals, the arrangement being such that the digital value recorded in any cell area may be gated by said timing signals over a longer time interval than one-half of a cell period.

References Cited by the Examiner

UNITED STATES PATENTS

| | | | |
|---|---|---|---|
| 3,217,329 | 11/1965 | Gabor | 340—174.1 |
| 3,271,750 | 9/1966 | Padalino | 340—174.1 |

BERNARD KONICK, *Primary Examiner.*

V. P. CANNEY, *Assistant Examiner.*

UNITED STATES PATENT OFFICE
CERTIFICATE OF CORRECTION

Patent No. 3,311,904 March 28, 1967

Norman B. Talsoe

It is hereby certified that error appears in the above numbered patent requiring correction and that the said Letters Patent should read as corrected below.

Column 5, line 28, for "feedback" read -- readback --; column 7, line 2, strike out "rate"; line 62, for "occurance" read -- occurrence --.

Signed and sealed this 21st day of November 1967.

(SEAL)
Attest:

Edward M. Fletcher, Jr.
Attesting Officer

EDWARD J. BRENNER
Commissioner of Patents